(12) United States Patent
Poncet-Legrand et al.

(10) Patent No.: US 8,029,897 B2
(45) Date of Patent: Oct. 4, 2011

(54) NANOMETRIC OR MESOSCOPIC DISSYMETRIC PARTICLES, AND METHOD FOR PREPARING SAME

(75) Inventors: Céline Poncet-Legrand, Montpellier (FR); Serge Ravaine, Cestas (FR); Etienne Duguet, Bègles (FR); Elodie Bourgeat-Lami, Nievroz (FR); Stéphane Reculusa, Bayonne (FR); Christophe Mingotaud, Toulouse (FR)

(73) Assignees: Centre National de la Recherche Scientifique, Paris (FR); CPE Lyon Formation Continue et Recherche, Villeurbanne (FR); Universite Paul Sabatier, Toulouse (FR)

( * ) Notice: Subject to any disclaimer, the term of this patent is extended or adjusted under 35 U.S.C. 154(b) by 853 days.

(21) Appl. No.: 10/533,879

(22) PCT Filed: Oct. 28, 2003

(86) PCT No.: PCT/FR03/03211
§ 371 (c)(1),
(2), (4) Date: Jan. 6, 2006

(87) PCT Pub. No.: WO2004/044061
PCT Pub. Date: May 27, 2004

(65) Prior Publication Data
US 2006/0134420 A1    Jun. 22, 2006

(30) Foreign Application Priority Data
Nov. 5, 2002   (FR) ...................................... 02 13800

(51) Int. Cl.
*B32B 15/02*    (2006.01)
*C01G 1/02*    (2006.01)

(52) U.S. Cl. ......................................... 428/402; 423/47
(58) Field of Classification Search .................... 423/57
See application file for complete search history.

(56) References Cited

U.S. PATENT DOCUMENTS
5,718,907 A * 2/1998 Labarre .......................... 424/401
(Continued)

FOREIGN PATENT DOCUMENTS
EP     0 573 150 A2   12/1993
(Continued)

OTHER PUBLICATIONS

Designed Hybrid Organic-Inorganic Nanocomposites from Functional Nanobuilding Blocks. Sanchez, C., Soler-Illia, G.J.A.A., Ribot, F., Lalot, T., Mayer, C.R., and Cabuil, V. Chem. Mater., 13, 10, 3061-3083, 2001.*

(Continued)

*Primary Examiner* — David Sample
*Assistant Examiner* — Nicole T Gugliotta
(74) *Attorney, Agent, or Firm* — Buchanan, Ingersoll & Rooney PC (57) ABSTRACT

The invention relates to nanometric or mesoscopic dissymmetric particles, and to a method for preparing the same.
The particles have an inorganic part A and a spherical organic part B bound by physicochemical or covalent interactions. Material A is a metal oxide, a metal or a metal chalcogenide. Material B is a polymer consisting of recurrent units derived from a vinyl compound. The particles are obtained by modifying the surface of material A particles with a coupling agent C having a function $F_C$ which exhibits affinity for the polymer, and contacting the modified inorganic particles with the precursor(s) of the polymer B, in the presence of a free radical initiator and of a surfactant in solution in a solvent.

32 Claims, 3 Drawing Sheets

U.S. PATENT DOCUMENTS

| | | | | |
|---|---|---|---|---|
| 5,856,379 A | * | 1/1999 | Shiratsuchi et al. | 523/209 |
| 5,868,966 A | * | 2/1999 | Wei et al. | 252/500 |
| 6,066,269 A | * | 5/2000 | Wei et al. | 252/500 |
| 6,160,067 A | | 12/2000 | Eriyama et al. | 526/279 |
| 6,624,741 B1 | * | 9/2003 | Dais et al. | 340/5.72 |
| 6,861,091 B2 | * | 3/2005 | Sellinger | 427/157 |
| 2002/0106513 A1 | * | 8/2002 | Matyjaszewski et al. | 428/404 |
| 2003/0102099 A1 | * | 6/2003 | Yadav et al. | 162/208 |
| 2005/0208543 A1 | * | 9/2005 | Vann et al. | 435/6 |
| 2007/0197693 A1 | * | 8/2007 | Ok et al. | 524/80 |
| 2008/0017070 A1 | * | 1/2008 | Prezzi et al. | 106/287.13 |
| 2009/0042021 A1 | * | 2/2009 | Kikuchi et al. | 428/328 |
| 2009/0240013 A1 | * | 9/2009 | Timmons et al. | 526/241 |

FOREIGN PATENT DOCUMENTS

| | | |
|---|---|---|
| EP | 0 803 550 A2 | 10/1997 |
| EP | 1 325 944 A2 | 7/2003 |
| WO | WO 02/16267 A1 | 2/2002 |

OTHER PUBLICATIONS

Reculusa et al. Chem. Mater. 14:2354-2359, published online Apr. 27, 2002.*

Xia et al., "A Self-Assembly Approach to the Formation of Asymmetric Dimers from Monodispersed Spherical Colloids", J. Am. Chem. Soc. 2001, 123, 771-772.*

Pyun et al. (Chem. Mater. 2001, 13, 3436-3448).*

Jung et al., "Polymerization in Polymerizable Vesicle Bilayer Membranes", Langmuir, vol. 16, pp. 4185-4195, XP002251731, 2000.

Search Report issued in International Application No. PCT/FRO3/03211, Mar. 31, 2004.

Reculusa et al, "Dissymmetrical Nanoparticles" *Dekker Encyclopedia of Nanoscience and Nanotechnology*, (2004) p. 943-953.

* cited by examiner

NANOMETRIC OR MESOSCOPIC DISSYMETRIC PARTICLES, AND METHOD FOR PREPARING SAME

BACKGROUND OF THE INVENTION

1. Field of the Invention

The present invention relates to nanometric or mesoscopic dissymmetric particles comprising a part consisting of an inorganic material and a part consisting of an organic material, and also to a method for preparing them.

2. Description of the Related Art

It is known practice to prepare dissymmetric particles comprising two organic parts by reaction of latex particles (polystyrene) with styrene monomer in the presence of divinylbenzene as a crosslinking reagent, 2,2'-azobis(2-methylbutyronitrile) as a polymerization initiator and poly-N-vinylpyrrolidone as a stabilizer. Such a method thus consists in bringing about the growth of a polymer by a free-radical process using a particle of latex that has been preconstituted and swollen with a mixture of monomers under conditions such that phase-separation of the latex and of the polymer formed is promoted [cf. H. R. Sheu, et al., J. of Polymer Science: Part A: Polymer Chemistry, Vol. 28, 653-667 (1990)].

The preparation of solid particles that are amphiphilic in nature is known from WO 01/85324. The method consists in partially modifying the surface of a mineral particle with organic chains which are hydrophobic in nature. The product obtained is an emulsifying composition comprising nanometric mineral particles that have a core made of mineral material and a hydrophobic organic coating on part of its surface, the hydrophobic coating being obtained in particular by covalent bonding using a compound comprising a long alkyl chain and a silanol group.

A method for preparing silica particles, at the surface of which small polystyrene particles are attached, is also known. Said method comprises a first step during which a suspension of silica particles is prepared, a second step during which a hydrophilic PEG methacrylate macromonomer is adsorbed onto said silica particles, and a third step during which emulsion polymerization of styrene is carried out in the presence of the modified silica particles. The concentrations of macromonomer used are 0.1 and 0.05 g.l$^{-1}$ for a concentration of silica particles of 10 g.l$^{-1}$. The particles obtained by means of this method consist of a silica core and of small nodules of polymer distributed evenly at the surface of the silica core (cf. Syntheses of Raspberrylike Silica/Polystyrene Materials, S. Reculusa, et al., Chem. Mater. 2002, 14 2354-2359 (published on Apr. 27, 2002)).

SUMMARY OF THE INVENTION

The aim of the present invention is to provide particles of nanometric or mesoscopic sizes comprising an organic part and a mineral part. The term "nanometric sizes" is intended to mean sizes of between 1 nm and 100 nm. The term "mesoscopic sizes" is intended to mean sizes of between 100 nm and 1 µm.

The particles according to the invention are dissymmetric particles of nanometric or mesoscopic sizes, that have an inorganic part consisting of a material A and an organic part consisting of a material B. They are characterized in that:
  the inorganic material A is a mineral oxide or a metal;
  the organic material B is a polymer consisting of recurrent units derived from a vinyl compound;
  the organic part is substantially spherical in shape;
  the two parts are bound by physicochemical or covalent interactions;
  the size of each of the parts is between 5 nm and 1 µm, preferably between 50 nm and 250 nm.

DETAILED DESCRIPTION OF THE PREFERRED EMBODIMENTS

The inorganic material A may be a mineral oxide or a metal. The mineral oxide can be chosen, for example, from silica, iron oxides, aluminosilicates (for instance clays and zeolites), titanium dioxide or alumina. The metal can be chosen, for example, from metals that are stable in an aqueous medium (for example gold, silver and palladium). In a particular embodiment, the inorganic material bears an organic group. Such a group can be chosen, for example, from alkyl groups, and amine, thiol or nitrile functions. Silica is particularly preferred as inorganic material A.

The polymer constituting the organic material B comprises recurrent units —CR=CR'—, which may be identical or different, in which:
  R represents H or an alkyl group;
  R' represents H, an alkyl group, an aryl group, an alkylaryl group, an alkenylaryl group, a pyridyl group, a nitrile group, a group —COOR" or a group —OC(O)R" in which R" is H, an alkyl or an alkenyl.

When R, R' or R" represents an alkyl group or an aryl group, it may bear a functional group, chosen for example from halides and amino groups.

The polymer constituting the organic material B may be crosslinked or noncrosslinked.

A polystyrene or a copolymer of styrene and of divinylbenzene is particularly preferred as organic material B.

The inorganic part of the dissymmetric particles of the invention may have the shape of a sphere, an ellipse, a disk, a block or a rod, whereas the organic part is always substantially spherical in shape. In a preferred embodiment, the inorganic part is spherical in shape and, in this case, the dissymmetric particles have the shape of a dumbbell when the organic and inorganic parts are substantially the same size, or the shape of a snowman if the size of one of the parts is clearly bigger than the other. The shape of the dissymmetrical particles of the invention can be identified by various microscopy techniques, in particular by transmission electron microscopy.

The method for obtaining the particles is characterized in that it comprises the following steps:

a) during a first step, the surface of particles consisting of the inorganic material A, and the size of which is between 5 nm and 1 μm, is modified with a coupling agent C comprising a function $F_C$ which exhibits affinity for one or more precursors of the polymer B;

b) during a second step, the modified inorganic particles obtained at the end of step a) are brought into contact with the precursor(s) of the polymer B, in the presence of a free-radical initiator and of a surfactant in solution in a solvent, in proportions that allow the formation of one nodule of polymer per inorganic particle.

For step a), it is advantageous to use an amount of coupling agent that corresponds to approximately 0.1 mol of coupling agent per m$^2$ of surface of silica particle.

If Ns denotes the number of polymerization seeds, SA the surfactant and I the free-radical initiator, then the number of polymerization seeds can be estimated, as a first approximation, by means of the relationship $Ns \approx [SA]^{0.6}[I]^{0.4}$. For each particular case, according to the number of particles A present in the reaction medium and to their size, the operator will perform preliminary trials, that are within the scope of those skilled in the art, by varying the concentrations of SA and of I, in order to determine the optimum concentrations. Another procedure consists in fixing the amount of monomer, of initiator and of surfactant, and also the reaction time and temperature, and in performing trials of various concentrations of silica particles having a given size, in order to determine the optimum amount of said particles. This second embodiment is particularly preferred.

The implementation of steps a) and b) in the method makes it possible to obtain dissymmetric particles in the form of a colloidal solution in a solvent.

The particles can be recovered in the form of a powder by eliminating the solvent, when the organic part of the particle consists of a polymer whose glass transition temperature is greater the ambient temperature. When the transition temperature of the material is not compatible with the temperature required for drying, the particles can be recovered by lyophilization.

The initial inorganic particles of material A used in step a) of the method may have the shape of a sphere, an ellipse, a disk, a block or a rod. The shape of the particles used is found in the inorganic part of the dissymmetric particles obtained after the treatment of step b). It is preferable to use inorganic particles that have a narrow size distribution, so as to obtain hybrid particles of the same nature. As a result, in step b), the polymer nodules that form all have substantially the same size. With larger or smaller inorganic particles, hybrid particles in the shape of snowmen will form. With inorganic particles of the same size, hybrid particles in the shape of a dumbbell will form. Very small inorganic particles may not attach a nodule, and very large inorganic particles may attach two nodules. The initial inorganic particles are preferably used, for step a), in the form of a colloidal suspension for which the solids content is between 2 and 35%, preferably from 10 to 25%, and for which the pH is adjusted so as to allow the interaction with the coupling agent C.

The inorganic particles A used in step a) of the method are chosen according to the material desired for the inorganic part of the dissymmetric particles that it is desired to prepare, it being understood that the material of the initial particle is identical to the material of the inorganic part of the dissymmetric particle.

A particularly advantageous case consists of the use of particles of silica having a diameter of approximately 100 nm. Such particles can be obtained by sol-gel processing, well-known in particular under the name Stöber process. According to this process, a basic aqueous-alcoholic solution is prepared by adding an aqueous ammonia solution to a given volume of alcohol, preferably ethanol. After homogenization, a silica precursor of tetraalkoxysilane type, preferably tetraethoxysilane, is added and the reaction takes place for at least 12 hours with moderate stirring and with the temperature being controlled.

Step a) can be carried out in various ways.

According to a first embodiment, the inorganic particles are brought into contact with, as coupling agent C, a macromolecule having a hydrophilic chain that ends with a polymerizable function $F_C$, said macromolecule being referred to hereinafter as macromonomer, and the reaction medium is stirred for a certain amount of time. As examples of macromonomers, mention may be made of poly(ethylene oxide)s, hydroxycelluloses, poly(vinylpyrrolidone)s, poly(acrylic acid)s and poly(polyvinyl alcohol)s, said compounds bearing the abovementioned free-radical polymerizable function $F_C$. The polymerizable function $F_C$ may be, for example, a vinyl group, a methacrylate group or an allyl group. When the inorganic particles are silica particles, a poly(ethylene glycol) monomethyl ether methacrylate can advantageously be used as macromonomer.

To determine the amount of macromonomer required, the adsorption isotherm of the macromonomer chosen on the inorganic particle can, for example, be measured. If an adsorption is effectively observed, those skilled in the art may carry out preliminary trials using low concentrations, which are in general sufficient, in order to avoid promoting the nucleation of particles in the continuous phase during step b), so as to determine the optimum conditions.

The amount of time required to ensure complete adsorption of the macromonomer onto the particle A during step a) should be adjusted according to the nature of the macromonomer and of the inorganic particle. A period of 24 hours is generally sufficient.

According to a second embodiment, step a) can be carried out by covalent grafting of a coupling agent C bearing a function $F_C$ which is copolymerizable with the precursor(s) of the polymer B.

When A is a mineral oxide, the coupling agent attached by covalent grafting can be chosen from organometallic derivatives such as organosilanes corresponding to the formula $R^1{}_n SiX_{4-n}$ (n=1 to 3), in which X is a hydrolyzable group (for example a halogen or an alkoxide) and $R^1$ is a radical comprising the abovementioned functional group $F_C$. Such a coupling agent can be chosen in particular from silanes bearing polymerizable groups such as vinyl, allyl, styryl, methacryloyl and acryloyl groups. Methacryloylalkyltri-alkoxysilanes are particularly preferred. The surface of the inorganic particle is then modified so as to allow attachment of the growing polymer nuclei. In this case, the method for modifying the inorganic particles consists in adsorbing the coupling agent to the surface of the particles, and then in heating the reaction medium to the required temperature so as to ensure covalent grafting of the compound by means of the hydrolysis-condensation reaction of the groups X with the surface hydroxyl groups. The excess of the various reagents can be eliminated from the reaction medium at the end of the method by dialysis. The particles thus obtained are made up of a core made of inorganic material bearing, at its surface, organic substituents that have a free polymerizable function. This method is particularly advantageous when the mineral oxide is a silica.

When A is a metal, the coupling agent attached by covalent grafting can be chosen from organothiols RSH and amines $RNH_2$ in which R is a substituent bearing the functional group $F_C$ exhibiting affinity for the polymer B or a precursor of said polymer. As an example of such a coupling agent, mention may be made of 4-vinyl-aniline. The coupling agent may also be chosen from aminosilanes and thiosilanes, which would be grafted onto the metal particle via the amine function or via the thio function, respectively, and which would enable the subsequent condensation of a silane bearing the function $F_C$ required by virtue of the nature of the polymer used in step b).

In a third embodiment, the inorganic particles are suspended at a pH close to neutrality such that they are surface-charged, in the presence of an amphiphilic compound consisting of a hydrophobic part that has a polymerizable group and of a polar head that bears a charge opposite to that of the surface. The amphiphilic compounds can adsorb strongly to the surface of the inorganic particle via electrostatic interactions. These amphiphilic molecules, which simultaneously exhibit a surfactant nature and which are monomers, are known to those skilled in the art as surfiners. As examples of surfiners, mention may be made of compounds derived from styrene sulfonates (having a negatively charged hydrophilic polar head) and quaternary alkyl-ammoniums (having a positively charged polar head), the two types of compound bearing a hydrophobic group (such as a long alkyl chain for example) that ends with a polymerizable function. N,N-Dimethyl-N-[11-p-vinyl-benzoyloxy)undecyl]octadecylammonium bromide, the synthesis of which is described by Jung et al., in Langmuir 2000, 16, 4185-4195, is a typical case of the polymerizable quaternary ammonium.

Various embodiments of step b) also exist.

According to a first variant, step b) is carried out by bringing the modified particles of inorganic material A obtained at the end of step a) into contact with a monomer which is a precursor of the polymer B, in the presence of a polymerization initiator, said monomer bearing functions $F_B$ capable of reacting with the functions $F_C$. This embodiment is particularly preferred.

According to a second variant, step b) is carried out by bringing the particles of material A obtained at the end of step a) into contact with an oligomer of the polymer B, in the presence of a polymerization initiator.

In all the variants, the polymerization process of step b) can be stopped by cooling the reaction medium to ambient temperature, and then dialyzing the cooled reaction medium so as to eliminate the traces of monomer and of initiator which that have not reacted, and also the excess surfactant.

The dissymmetric particles obtained at the end of step b) can be subjected to a further treatment aimed at modifying the surface groups of the material A that were not modified during step b).

When the precursor of the polymer B is a monomer, it is preferably chosen from compounds having a vinyl group that plays the role of polymerizable function $F_B$. Such compounds correspond, for example, to the formula HRC=CHR' in which R and R' have the meaning given above. Mention may in particular be made of monomers that contain a vinyl group, in particular styrene, α-methylstyrene, vinylpyridine, vinyl acetate or vinyl propionate. Mention may also be made of monomers comprising an acrylic group, in particular vinyl esters of the methyl methacrylate, ethyl acrylate, butyl acrylate, ethylhexyl methacrylate, acrylonitrile or methacrylonitrile type.

To obtain a crosslinked organic material B, a mixture of monomers comprising one or more of the monomers above, and a crosslinking monomer comprising a second group $F_B$, is used. As examples of crosslinking monomers, mention may be made of ethylene glycol dimethacrylate (EGDMA), diethylene glycol dimeth-acrylate, vinyl methacrylate or divinyl-benzene. The proportion of monomer capable of crosslinking, relative to the monofunctional monomer, is preferably from 1 to 10% by weight.

When the precursor of the polymer B is an oligomer, it is preferably chosen from the polymers or copolymers obtained from a monomer as defined above, or from a mixture of monomers optionally comprising a crosslinking monomer.

Water or a water-alcohol (preferably ethanol) mixture in water/alcohol proportions of between 100/0 and 50/50 is preferably used as solvent.

The surfactant makes it possible to carry out the reaction in an emulsion or in a miniemulsion. It can be chosen from anionic, cationic or nonionic surfactants. For the nonionic surfactants, polyoxyethylenated alkyl-phenols can for example be used. As an anionic surfactant, an alkylbenzene sulfonate or an alkyl sulfonate can for example be used. When the polymerization is carried out in a dispersion, a steric stabilizer, such as a poly(N-vinylpyrrolidone) or hydroxypropylcellulose, is added to the reaction medium. Some of these compounds were mentioned as a coupling agent and consequently perform a double function.

The shape of the dissymmetric particles obtained at the end of step b) depends, firstly, on the shape of the initial inorganic particles and, secondly, on the duration of step b). When the inorganic particles are spherical in shape, the dissymmetric particles obtained have a shape comprising two spherical parts. If step b) is short, the inorganic part is larger than the organic part. When the duration of step b) increases, the size of the two parts becomes equal and a "dumbbell" shape is first obtained, followed by a snowman shape in which the inorganic part is smaller than the organic part.

The dissymmetric particles obtained by means of the method of the invention can be modified by reaction of the active functions present on the organic part or on the mineral part.

The particles of the invention can be used in many technical fields. An appropriate modification of the amphiphilic nature according to their chemical characteristic, and the choice of a specific size, make it possible to stabilize many "oil/water" emulsions. Thus, the particles could be useful in particular in the paint industry.

The present invention is described in greater detail by means of the following examples which are given by way of illustration, but to which it is not, however, limited.

In all the examples, use is made, as initial inorganic particles, of silica particles approximately 100 nanometers in diameter, prepared by means of a sol-gel process, referred to as "Stöber process", in the following way.

A basic aqueous-alcoholic solution was prepared by adding 75 ml of an aqueous ammonia solution, containing an average percentage by mass of 29% of ammonia, to 1 l of ethanol. After homogenization, 30 ml of tetraethoxysilane were added as silica precursor, and the reaction medium was left for 12 hours with moderate stirring and with the temperature being controlled.

The preparation was effected at various temperatures, all the other conditions having remained unchanged. Approximately 8 g of silica were thus obtained, in each case. The diameter of the particles obtained (Ο), as a function of the temperature (T) of the reaction, is given in table 1.

TABLE 1

| T | Φ |
|---|---|
| 20° C. | 200 nm |
| 35° C. | 150 nm |

TABLE 1-continued

| T | Φ |
|---|---|
| 50° C. | 100 nm |
| 60° C. | 80 nm |
| 70° C. | 50 nm |

After the end of the synthesis, the excesses of reagents were eliminated by successive dialyses in dialysis bags immersed in distilled water so as to exchange the ethanol solvent against water. The dialysis bags consist of a regenerated cellulose membrane. The dialysis is considered to be complete when the pH of the water outside the membrane approaches neutrality (between 7 and 8). The suspension obtained was concentrated by immersing the dialysis bag in a concentrated aqueous solution containing approxi-mately 200 g.l$^{-1}$ of polyethylene glycol (35 000 g.mol$^{-1}$). The concentration of silica in the suspension was subsequently determined by measuring the mass of a dry extract.

Examples 1 to 3 illustrate the modification of the surface of the initial inorganic particles, in accordance with the first step of the method of the invention.

Examples 4 and 5 illustrate the preparation of dissymmetric particles from the silica particles whose surface was modified.

Example 1

Modification of The Surface of The Silica Particles by Adsorption of a Macromonomer The surface of the initial silica particles was modified in the following way, using suspensions of the particles having the respective concentrations indicated in the table below.

| Silica size (nm) | Silica concentration (g. l$^{-1}$) |
|---|---|
| 50 | 2.5 |
| 80 | 10 |
| 100 | 20 |
| 150 | 67.5 |
| 200 | 160 |

An aqueous solution of poly(ethylene glycol) monomethyl ether methacrylate (which is a macromolecule having a hydrophilic chain that ends with a polymerizable function) was added to the aqueous suspension of colloidal silica particles, in proportions such that the amount of macromonomer is close to 2 mg per m$^2$ of silica (it being recalled that the surface of a silica particle is taken to be equal to $4.\Pi.r^2$, r being the mean radius of the particle). After the mixture had been stirred for 24 hours, the degree of adsorption of the macromolecule onto the silica was considered to be satisfactory. Dialysis was carried out under the conditions mentioned above.

Example 2

Modification of the Surface of the Silica Particles by Grafting a Functional Trialkoxysilane A trial was carried out for suspensions of initial silica particles similar to the suspensions defined in the table of example 1.

Methacryloxymethyltriethoxysilane (approximately 0.15 µmol per m$^2$ of surface of silica) was added to each suspension of silica, after having brought the reaction medium back to ambient temperature. The reaction medium was left to stand for 12 hours in order for the compound to adsorb to the surface of the particles, and then the reactor was brought to 100° C. in order to ensure the covalent grafting of the compound by means of a hydrolysis-condensation reaction of the ethoxy groups with the silanol groups of the surface of the silica particles. The suspension of modified particles obtained was subsequently subjected to dialysis.

Example 3

Modification of the Surface of the Silica Particles with a Surfmer

A trial was carried out for suspensions of initial silica particles similar to the suspensions defined in the table of example 1.

0.066 µmol (i.e. 45.2 µg) per m$^2$ of silica, of N,N-dimethyl-N-[11-(p-vinylbenzoyloxy)undecyl]octadecyl-ammonium bromide, synthesized beforehand according to the method described by Jung et al. (*Langmuir* 2000, 16, 4185-4195) was added to each suspension of silica at neutral pH. After adsorption for 12 hours, the excesses of reagents were removed by dialysis.

Example 4

Synthesis of the Polymer Nodules

Surface-modified silica particles obtained according to the method of examples 1 to 3 were modified by attaching a nodule of polystyrene in the following way:
- a nonionic surfactant (0.3 g diluted in 2 ml of distilled water) of polyethylene glycol nonyl-phenyl ether type was added to 100 ml of a suspension of modified particles at the concentra-tion of 10 g.l$^{-1}$, such that the concentration of surfactant (3 g.l$^{-1}$) was greater than the critical micellar concentration (CMC) of said surfactant;
- styrene monomer (10 g, i.e. 11 ml) was added such that its concentration was 100 g.l$^{-1}$, and the mixture was vigorously stirred in order to ensure that the reaction medium was homogeneous;
- the suspension was degassed by circulating a stream of nitrogen, and the temperature was gradually increased to 70° C., which is the standard condition for styrene polymerization;
- when the thermal equilibrium was reached, after about fifteen minutes, a free-radical initiator, sodium persulfate, was added in the proportion of 0.5% by mass of monomer (0.05 g diluted in 2 ml of distilled water), in order to initiate the polymerization reaction. After homogenization, the stirring was brought back to 300 rpm;
- after a time t, the reaction medium was brought back to ambient temperature, and then dialysis was performed under the conditions described above in order to eliminate the traces of monomer and of initiator that have not reacted, and also the excess surfactant.

The dissymmetric particles obtained were characterized by transmission electronic microscopy.

Figure 1:
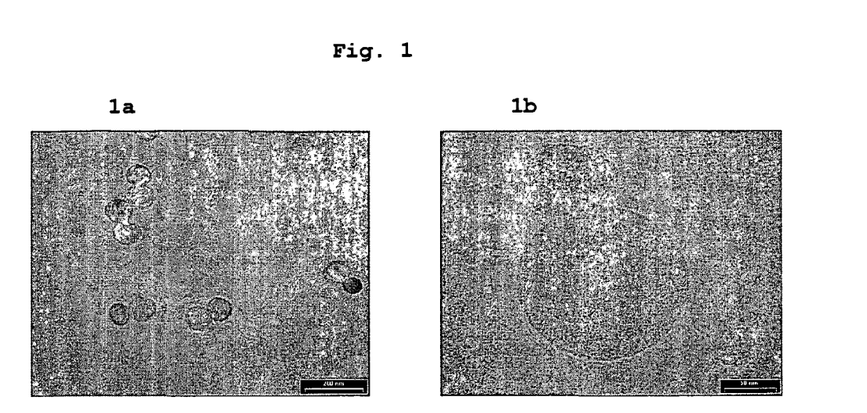
FIG. 1 represents a micrograph of dissymmetric particles obtained from modified silica particles having a diameter of 100 nm.

FIG. 1 represents a micrograph of the dissymmetric particles obtained from the silica particles having a diameter of 100 nm modified according to example 1, and treated with styrene for a period of 45 min (1*a*) and 60 min (1*b*), respectively. After 45 min, the dissymmetric particles have a "dumbbell" shape with a silica part (in dark grey) and a polymer part (in lighter grey), each being spherical in shape and having a size in the region of 100 nm. At 60 min, the dissymmetric particles have a "snowman" shape in which the size of the polymer part is greater than that of the silica part, which remains that of the silica particles of origin, i.e. 100 nm.

Figure 2:
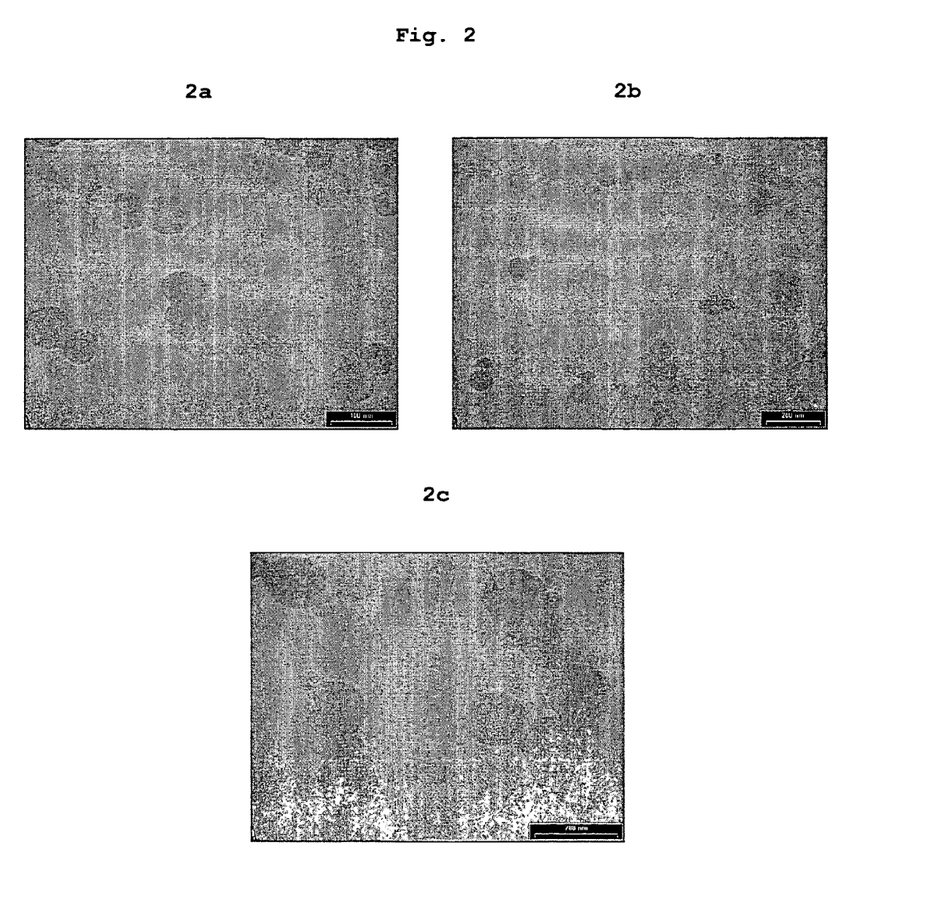
FIG. 2 represents a micrograph of dissymmetric particles obtained from modified silica particles having a diameter of 50 nm.

FIG. 2 represents a micrograph of the dissymmetric particles obtained from the silica particles having a diameter of 50 nm modified according to example 1, and treated with styrene for a period of 20 min (2a), 45 min (2b) and 120 min (2c), respectively.

Figure 3:
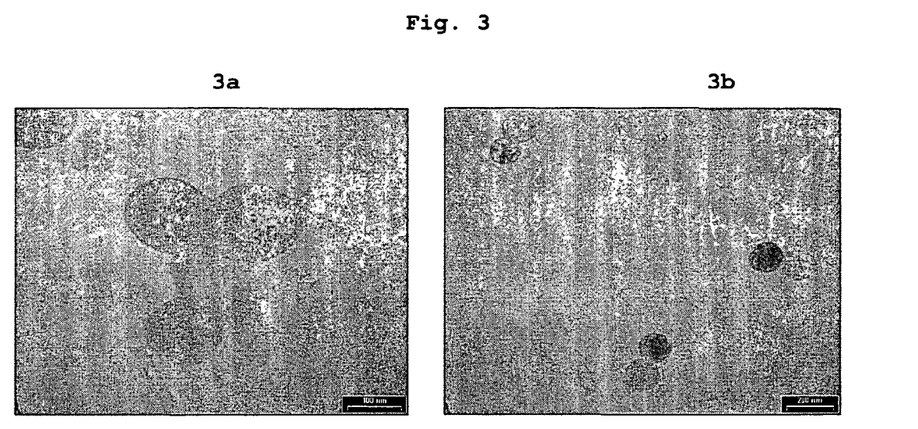
FIG. 3 represents a micrograph of dissymmetric particles obtained from modified silica particles having a diameter of 150 nm.

FIG. 3 represents a micrograph of the dissymmetric particles obtained from the silica particles having a diameter of 150 nm modified according to example 1, and treated with styrene for a period of 30 min (3a) and 120 min (3b), respectively.

Figure 4:
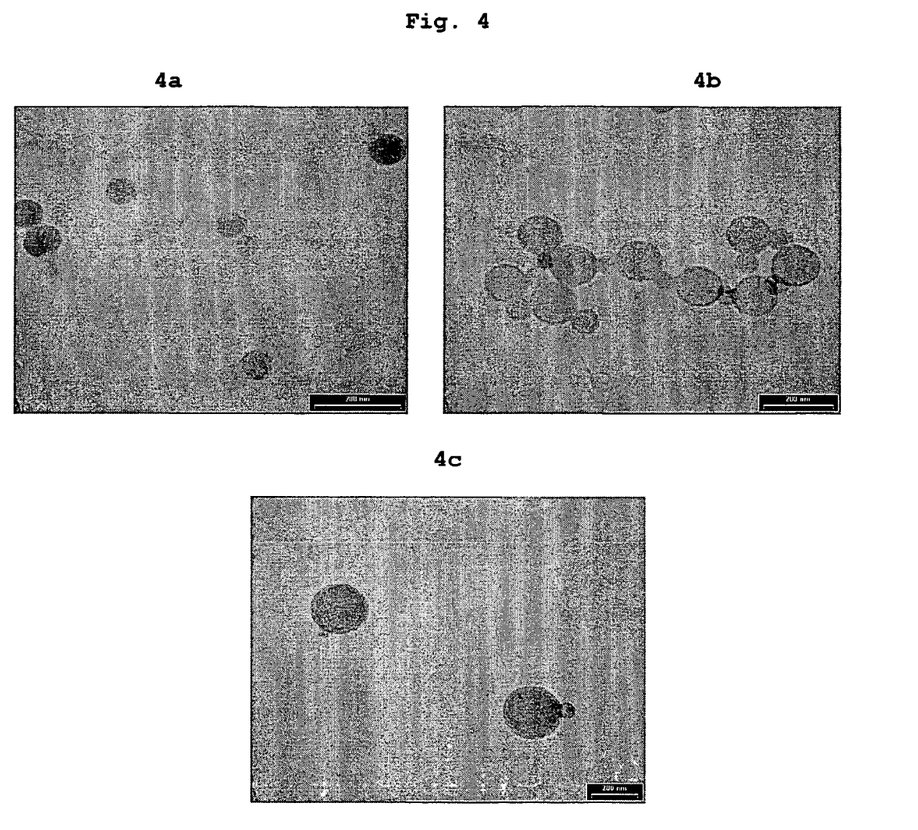
FIG. 4 represents a micrograph of dissymmetric particles obtained from modified silica particles having a diameter of 80 nm.

FIG. 4 represents a micrograph of the dissymmetric particles obtained from the silica particles having a diameter of 80 nm modified according to example 2, and treated with styrene for a period of 15 min (4a), 60 min (4b) and 120 min (4c), respectively.

Example 5

The procedure of example 4 was reproduced, using particles obtained according to example 1, but replacing the styrene with a mixture of styrene and of divinylbenzene. In the course of a first trial, a mixture consisting of 9.9 g of styrene and 0.1 g of divinylbenzene was used. In the course of the second trial, a mixture consisting of 9.8 g of styrene and 0.2 g of divinylbenzene was used.

The polymer nodules attached to the silica particles in the two cases consist of a crosslinked polystyrene.

Figure 5:
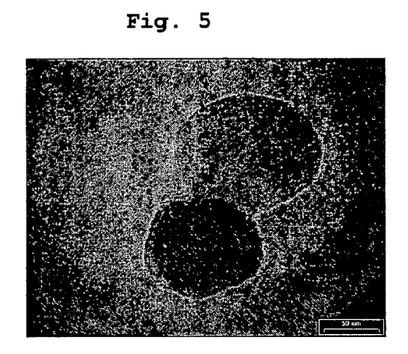
FIG. 5 represents a micrograph of surface-modified silica particles having a diameter of 80 nm.

FIG. 5 represents a micrograph of the dissymmetric particles obtained in the first trial from initial silica particles 100 nm in diameter, surface-modified according to example 1. They have a "snowman" shape in which the size of the polymer part (light grey) is greater than that of the silica part (dark grey), which remains that of the silica particles of origin.

Example 6

The procedure of example 5 was reproduced using initial silica particles 80 nm in diameter, surface-modified according to example 2, and a 95/5 by mass styrene/divinylbenzene mixture.

Figure 6:
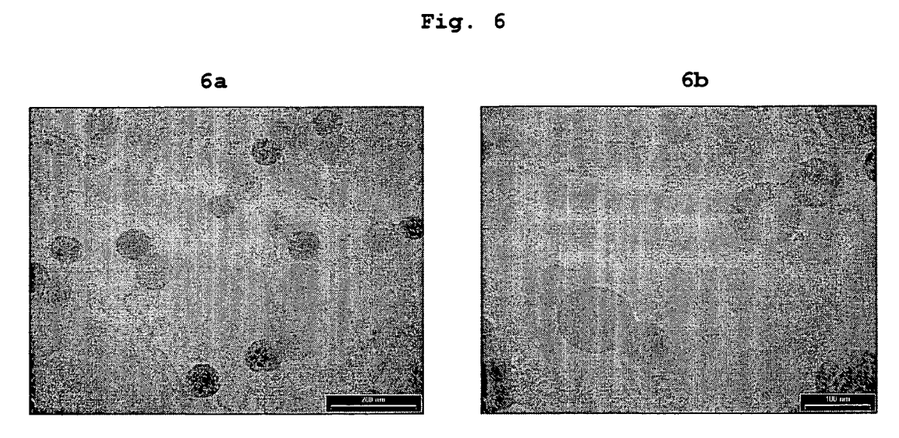
FIG. 6 represents a micrograph of dissymmetric particles obtained after a period of treatment.

FIG. 6 represents a micrograph of the dissymmetric particles obtained after a period of treatment of 60 min (6a) and 120 min (6b), respectively.

The invention claimed is:

1. A dissymmetric particle of nanometric or mesoscopic size consisting of a first part, a second part, and a coupling agent, wherein:
   the first part consists of a single particle of an inorganic material A of a mineral oxide or a metal, of between 50 and 250 nm, and having an outer surface to which is adsorbed or covalently grafted the coupling agent;
   the second part consists of a single substantially spherical nodule of organic material B of a polymer of recurrent vinyl units, having an outer surface coupled to an outer surface of the first part by the coupling agent;
   and wherein the coupling agent is a methacryloylalkyltrialkoxysilane, or a macromonomer of the group consisting of hydroxycelluloses, polyvinylpyrrolidones, polyacrylic acids, and poly(polyvinyl) alcohols.

2. The particle as claimed in claim 1, wherein the inorganic material A is an oxide chosen from silica, iron oxides, aluminosilicates, titanium dioxide or alumina.

3. The particle as claimed in claim 1, wherein the inorganic material A is a metal chosen from metals that are stable in an aqueous medium.

4. The particle as claimed in claim 1, wherein the inorganic material bears an organic group.

5. The particle as claimed in claim 4, wherein the organic group is chosen from alkyl groups, amine functions, thiol functions and nitrile functions.

6. The particle as claimed in claim 1, wherein the polymer comprises recurrent units —CR=CR'—, which may be identical or different, in which:
   R represents H or an alkyl group;
   R' represents H, an alkyl group, an aryl group, an alkylaryl group, an alkenylaryl group, a pyridyl group, a nitrile group, a group —COOR" or a group —OC(O)R" in which R" is H, an alkyl or an alkenyl.

7. The particle as claimed in claim 6, wherein the alkyl group or the aryl group bears a functional group.

8. The particle as claimed in claim 6, wherein the polymer is crosslinked or noncrosslinked.

9. The particle as claimed in claim 1, wherein the inorganic part has the shape of a sphere.

10. The particle as claimed in claim 9, wherein the particle has the shape of a dumbbell, the organic and inorganic parts having substantially the same size.

11. The particle as claimed in claim 9, wherein the particle has the shape of a snowman, the inorganic part having a size different from the organic part.

12. The particle as claimed in claim 1, wherein the inorganic part has the shape of an ellipse, of a disk, of a block or of a rod.

13. The particle as claimed in claim 1, wherein the inorganic material is silica and the organic material B is a polystyrene or a copolymer of styrene and of divinylbenzene.

14. A method for preparing a dissymmetric particle consisting of a singular inorganic first part of a mineral oxide or metal, a singular organic second part comprising a polymer of recurrent vinyl units, and a coupling agent, said method comprising the following steps:
   a) the surface modifying said first part of the particle having a size of between 50 nm and 250 nm and consisting of an inorganic material A is modified with coupling agents C comprising a function $F_C$ which exhibits affinity for one or more precursors of a second part consisting of an organic material B, said coupling agents being adsorbed by adsorbing or covalently grafting to an outer surface of said first part a coupling agent that is a methacryloylalkyltrialkoxysilane or a macromonomer selected from the group consisting of hydroxycelluloses, polyvinylpyrrolidones, polyacrylic acids, and poly(polyvinyl) alcohols; and
   b) combining the surface modified first part with precursor(s) of the polymer of the second part the presence of a free-radical initiator and a surfactant in solution in a solvent.

15. The method as claimed in claim 14, further comprising the step of extracting the dissymetric particle from the solvent by evaporation of the solvent or by lyophilization.

16. The method as claimed in claim 14, wherein the first part step a) is in the form of a colloidal suspension for which the solids content is between 2 and 35%.

17. The method as claimed in claim 14, wherein the first part is a silica particle having a diameter of approximately 100 nm.

18. The method as claimed in claim 14, wherein the coupling agent of step a) is a macromonomer and which macromonomer further comprises a macromolecule having a hydrophilic chain with a polymerizable function at one end thereof, and the reaction medium is stirred.

19. The method as claimed in claim 14, wherein step a) is carried out by covalent grafting of a coupling agent bearing a polymerizable function that is copolymerizable with the precursor(s) of the second part.

20. The method as claimed in claim 14, wherein step a) is carried out by suspending the first part at a pH close to neutrality, and adding an amphiphilic compound having a hydrophobic part that has a polymerizable group and a polar head that bears a charge opposite to that of the surface of the first part.

21. The method as claimed in claim 20, wherein the amphiphilic compound is chosen from compounds derived from styrene sulfonates and quaternary alkylammoniums, the two types of compounds bearing a hydrophobic group.

22. The method as claimed in claim 14, wherein step b) is carried out by bringing the surface modified first part into contact with a monomer a precursor of the second part, in the presence of a polymerization initiator, said monomer bearing a functional group reactive with the functional group of the coupling agent.

23. The method as claimed in claim 14, wherein step b) is carried out by bringing the surface modified first part into contact with an oligomer of the polymer of the second part, in the presence of a polymerization initiator.

24. The method as claimed in claim 14, wherein the dissymmetric particles obtained in step b) are subjected to a further treatment modifying surface groups of the material of the first part that were not modified during step b).

25. The method as claimed in claim 22, wherein the precursor is chosen from compounds having a vinyl group.

26. The method as claimed in claim 25, wherein the monomer corresponds to formula HRC=CHR' in which:
R represents H or an alkyl group;
R' represents H, an alkyl group, an aryl group, an alkylaryl group, an alkenylaryl group, a pyridyl group, a nitrile group, a group —COOR" or a group —OC(0)R" in which R" is H, an alkyl or an alkenyl.

27. The method as claimed in claim 26, wherein the monomer is chosen from styrene, □-methylstyrene, vinylpyridine, vinyl acetate, vinyl propionate, methyl methacrylate, ethyl acrylate, butyl acrylate, ethylhexyl methacrylate, acrylonitrile or and methacrylonitrile.

28. The method as claimed in claim 22, wherein the precursor of step b) comprises a mixture of one or more monomers having a first polymerizable group and one or more monomers comprising a second polymerizable group.

29. The method as claimed in claim 23, wherein the oligomer is obtained from monomers having a vinyl group.

30. The method as claimed in claim 14, wherein the solvent is chosen from water and water-alcohol mixtures in water/alcohol proportions of from 100/0 to 50/50.

31. The method as claimed in claim 14, wherein the surfactant is chosen from anionic, cationic and nonionic surfactants.

32. The particle of claim 1, wherein the size of the second part is between 50 nm and 250 nm.

* * * * *